US012192107B2

(12) United States Patent
Jabbar (10) Patent No.: US 12,192,107 B2
(45) Date of Patent: Jan. 7, 2025

(54) CONVERGED AVIONICS DATA NETWORK

(71) Applicant: GE Aviation Systems LLC, Grand Rapids, MI (US)

(72) Inventor: Abdul Jabbar, Altamont, NY (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 127 days.

(21) Appl. No.: 17/684,140

(22) Filed: Mar. 1, 2022

(65) Prior Publication Data

US 2023/0283560 A1 Sep. 7, 2023

(51) Int. Cl.
*H04L 47/22* (2022.01)
*H04L 12/12* (2006.01)
*H04L 47/24* (2022.01)
*H04L 47/2416* (2022.01)
*H04L 47/28* (2022.01)
(Continued)

(52) U.S. Cl.
CPC ............. *H04L 47/22* (2013.01); *H04L 12/12* (2013.01); *H04L 47/225* (2013.01); *H04L 47/24* (2013.01); *H04L 47/2416* (2013.01); *H04L 47/28* (2013.01); *H04L 49/206* (2013.01); *H04L 49/254* (2013.01); *H04L 49/35* (2013.01)

(58) Field of Classification Search
CPC ... H04L 47/225; H04L 47/6275; H04L 12/12; H04L 12/64; H04L 47/24; H04L 47/2416; H04L 47/28; H04L 49/206; H04L 49/254; H04L 49/35; H04L 49/60; H04L 67/12; H04L 47/22
See application file for complete search history.

(56) References Cited

U.S. PATENT DOCUMENTS 9,331,962 B2   5/2016   Lida et al.
9,871,700 B2   1/2018   Lida
(Continued)

FOREIGN PATENT DOCUMENTS

CN   111385224 A   7/2020
CN   210958404 U   7/2020
(Continued)

OTHER PUBLICATIONS

Finzi et al., Incorporating TSN/BLS in AFDX for Mixed-Criticality Avionics Applications: Specification and Analysis, arxiv.org, Cornell University Library,201 Olin Library Cornell University Ithaca, NY 14853,Jul. 8, 2017 (Jul. 18, 2017).

*Primary Examiner* — Omer S Mian
(74) *Attorney, Agent, or Firm* — McGarry Bair PC (57) ABSTRACT

An avionics data network includes a network switch core configured for a time-sensitive networking (TSN) schema, a first and second set of networking end nodes communicatively coupled with the network switch core. The first set of networking end nodes includes a first subset of networking end nodes configured for a TSN schema and second subset of networking end nodes configured for a legacy Ethernet schema. The network switch core is configured to receive, from the first set of networking end nodes, a set of data frames, determine the respective schema of the set of data frames, forward the set of data frames to a predetermined queue on an egress port based on the determined respective schema, and transmit set of data frames to an end node having a corresponding schema.

10 Claims, 6 Drawing Sheets

(51) Int. Cl.
  *H04L 49/20* (2022.01)
  *H04L 49/253* (2022.01)
  *H04L 49/35* (2022.01)

(56) References Cited

U.S. PATENT DOCUMENTS

| | | |
|---|---|---|
| 10,785,802 B2 | 9/2020 | Basu Mallick et al. |
| 2019/0116241 A1 | 4/2019 | Bonomi et al. |
| 2019/0207862 A1* | 7/2019 | Kajio ...................... H04L 67/02 |
| 2019/0245792 A1* | 8/2019 | Bush ...................... H04L 47/24 |
| 2020/0244576 A1 | 7/2020 | Wetterwald et al. |
| 2020/0259896 A1 | 8/2020 | Sachs et al. |
| 2020/0296165 A1 | 9/2020 | Von Hoyningen-Huene et al. |
| 2021/0392084 A1* | 12/2021 | Åkerberg ............ H04L 47/2491 |
| 2022/0094599 A1* | 3/2022 | Von Hoyningen-Huene ............... H04L 41/0806 |
| 2022/0210083 A1* | 6/2022 | Chen ...................... H04L 67/06 |

FOREIGN PATENT DOCUMENTS

| | | |
|---|---|---|
| EP | 3624419 A1 | 3/2020 |
| WO | 2021037837 A1 | 3/2021 |

\* cited by examiner

CONVERGED AVIONICS DATA NETWORK

TECHNICAL FIELD

This disclosure relates generally to data communication networks, and more specifically to systems and methods for transmitting data flows in converged data communications networks having a time-sensitive network schema.

BACKGROUND

For contemporary aircraft, an avionics 'platform' consists of a variety of elements such as sensors, data concentrators, a data communications network, radio frequency sensors and communication equipment, computational elements, effectors, and graphical displays. These components must share information with other components over the data communications network.

Legacy incarnations of these platform elements are in the form of individual subsystem elements, often referred to as "federated systems", in which various aircraft functions include a stand-alone set of sensors, processing units, and actuators. Federated avionics architectures make use of distributed avionics systems, which are packaged as self-contained line replaceable units (LRUs), with each system having its own interfaces to sensors and actuators. Multiple and separated federated systems can rely on common subsets of data sources, but lack the sharing of processing resources and interfaces among the federated systems. Data is typically not shared between the systems. This allows intrinsic partitioning of functions, which are local to the system, and requires dedicated communication channels.

As new network standards (e.g., using TSN schema) and integrated avionics architectures (which can share or route data anywhere within the architecture) are implemented in aircraft, the updated or new network standards and architectures must be compatible and interoperative with legacy standards (e.g. Ethernet schema) and LRUs.

Network components utilized to construct the data network including relays, switches, communicative connections, and the like, can utilize a specialized data protocol to ensure performance of the network architecture for the specialized data. For example, some conventional aircraft use Ethernet-based data network schema that are compliant with standards defined by the Institute of Electrical and Electronics Engineers (IEEE) to enable use of commercial off-the-shelf (COTS) hardware to reduce costs and development time. The use of Time Sensitive Networking (TSN) communication technology is also growing in use, particularly in aircraft and avionics applications. In some instances, legacy systems using an Ethernet-based schema and newer systems using TSN schema must coexist and interoperate on the same network.

BRIEF DESCRIPTION

Aspects of the disclosure relate to a converged avionics data network. The converged avionics data network includes a network switch core configured for a time-sensitive network (TSN) schema, a first set of networking end nodes and a second set of networking end nodes communicatively coupled with the network switch core. The first set of networking end nodes including a first subset of networking end nodes configured for a TSN schema and second subset of networking end nodes configured for a legacy Ethernet schema. The network switch core can be configured to receive, from the first set of networking end nodes, a set of data frames, determine the respective schema of the set of data frames, forward the set of data frames to a predetermined queue on an egress port of the network switch core based on the determined respective schema, and transmit the set of data frames to an end node of the second set of networking end nodes having a corresponding schema, and shape the set of data frames in accordance with the determined respective schema.

Aspects of the disclosure relate to a method of operating a network architecture. The method includes receiving, at a set of data ingress ports for a network switch core for a time-sensitive network (TSN) schema, a set of data frames from a first set of networking end nodes having a first subset of networking end nodes compliant with a TSN schema and a second subset of networking end nodes compliant with a legacy Ethernet schema, for transmission to a second set of networking end nodes. The method also includes determining, with the network switch core, the respective schema of the set of data frames, forwarding the set of data frames to a queue on the network switch core based on the determined respective schema, and transmitting, by the network switch core, the set of data frames to an end node of the second set of networking end nodes having a corresponding schema.

BRIEF DESCRIPTION OF THE DRAWINGS

A full and enabling disclosure of the present description, including the best mode thereof, directed to one of ordinary skill in the art, is set forth in the specification, which refers to the appended figures, in which.

DETAILED DESCRIPTION

Aspects of the disclosure described herein are provided with respect to a specialized avionics data protocol, but it will be understood that the apparatus and method described herein can be implemented in any environment using a data communications network interconnecting a set of data-generating components with a set of data-consuming components. Aspects of the disclosure can include data communications networks that are configured to operate according to defined network characteristics or specifications. Contemporary aircraft typically operate a set of components interconnected by way of a data network in accordance with a schema defined by a network standard. For example, many aircraft built prior to 2011 employ Ethernet data communication networks that are compliant with the IEEE 802.1Q-1990 specification which defines Ethernet operations and protocols including, but not limited to, redundancy, dedicated bandwidth, deterministic quality of service, and network switching performance. While aspects of the disclosure are described with respect to the Ethernet specification or Ethernet data frames, transmissions, and the like, the disclosure can be applicable to any legacy data transmissions. For example, aspects as described herein can apply to implementations of legacy Ethernet technology as defined by the IEEE 802.3 standard and its supplements for use in Aircraft Data Networks (ADN).

As used herein, "legacy Ethernet" or "legacy Ethernet schema" can refer, without limitation, to networks, components, elements, units, nodes, end stations, end systems, hubs, switches, bridges, controls, modules, pathways, data, data frames, traffic, protocols, operations, transmissions, and combinations thereof, that adhere to, or are compliant with one or more of IEEE 802.3 and IEEE 802.1 standards but not compliant with TSN Schema as defined by IEEE 802.1Q TSN standards. As such, as used herein, the term "legacy Ethernet" can be considered to be "non-TSN Ethernet".

Additional, updated or new network standards can be incorporated into contemporary aircraft in order to operate the set of interconnected components. In some instances, it is desirable to ensure the updated or new network standards are compatible and interoperative with legacy Ethernet systems or data transmissions. One non-limiting example of updated or new network standards can include time-sensitive networking (TSN) based standards, specifications, or transmission schemas. A non-limiting example of a TSN based standard can include network operations and data transmissions in accordance with TSN schemas compliant with the IEEE 802.1Q standards. Additional TSN schemas can be included. As used herein, "TSN schema" can refer, without limitation, to networks, components, elements, units, nodes, hubs, switches, bridges, end stations, end systems, controls, modules, pathways, data, data frames, traffic, protocols, operations, transmissions, and combinations thereof, that adhere to, or are compliant with one or more of IEEE 802.1Q TSN Standards. While "a set" of, and "a subset" of, various elements will be described, it will be understood that "a set" and "a subset" can include any number of the respective elements, including only one element. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements.

As used herein, a "system" or a "controller module", or a "processing module", or a "policing module", or a "shaper module" can include at least one processor and memory. Non-limiting examples of the memory can include Random Access Memory (RAM), Read-Only Memory (ROM), non-volatile memory (NVM, such as flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types. Suitable processor-readable media may also include transmission media such as electrical, electromagnetic, or digital signals, conveyed via a communication medium such as a network and/or a wireless link.

The exemplary drawings are for purposes of illustration only and the dimensions, positions, order and relative sizes reflected in the drawings attached hereto can vary.

Figure 1:
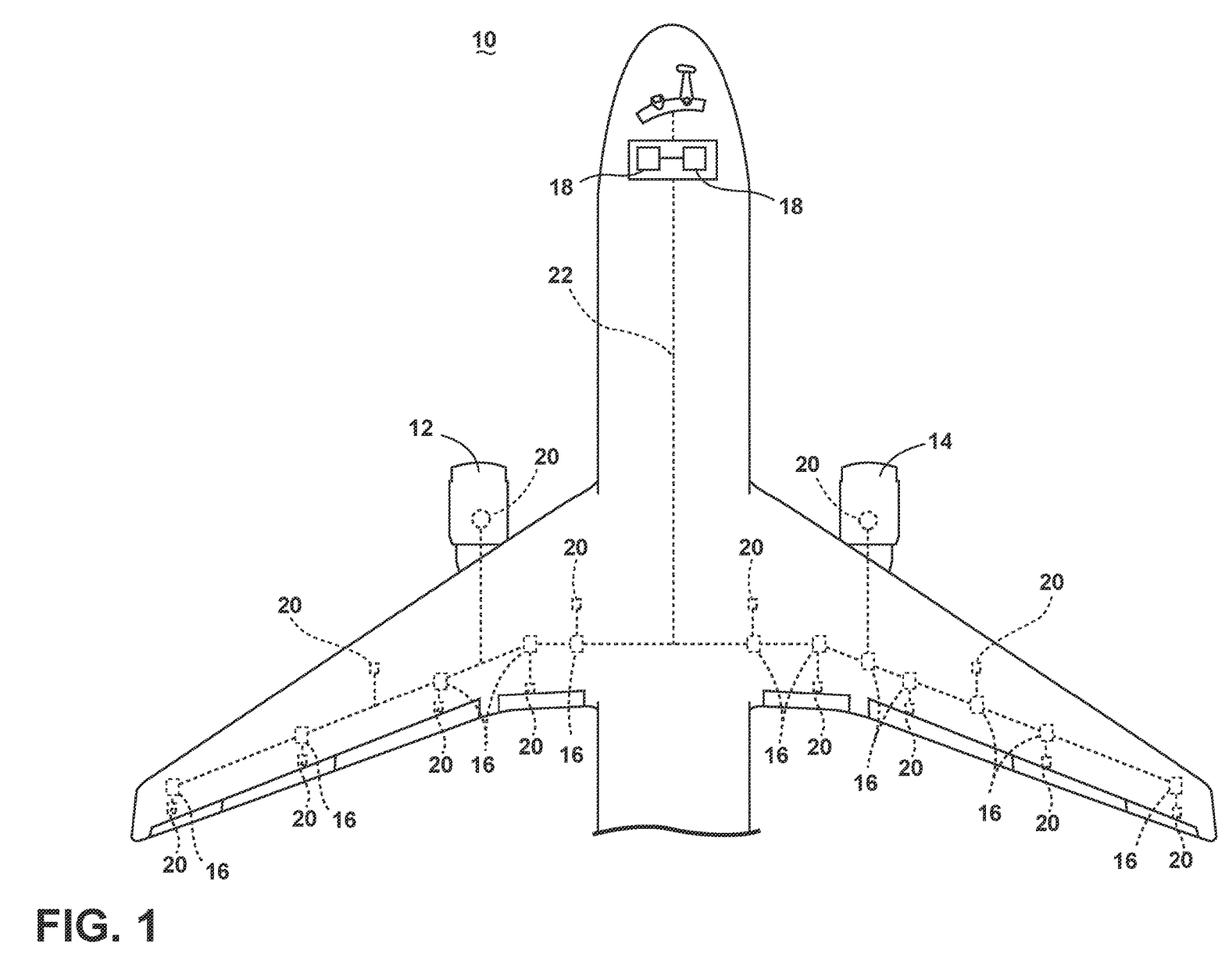
FIG. 1 is a top down schematic view of an example aircraft and avionics data network architecture of an aircraft, in accordance with various aspects described herein.

As illustrated in FIG. 1, an aircraft 10 can include at least one propulsion engine, shown as a left engine system 12 and right engine system 14. The aircraft 10 can further include one or more aircraft computers 18, including, but not limited to data storage or processing units, or functional systems such as the flight management system or autopilot system, and a set of fixed aircraft components, such as line-replaceable units (LRU) 20, networking end nodes (also referred to as "end stations" and "end systems"), or modular components of a vehicle or aircraft. In the aircraft environment, the aircraft computers or LRUs 20 can be designed to operate according to a particular operation, interoperability, or form factor standards, such as those defined by IEEE standards defining legacy Ethernet schema. In the exemplary aspects illustrated, the aircraft computers 18 can be positioned near the nose or cockpit of the aircraft 10 and the LRUs 20 can be positioned throughout the aircraft 10. The aircraft computers 18 and LRUs 20 can be configured to be communicatively coupled by way of a series of data transmission pathways 22, and network bridges or switches 16. The data transmission pathways 22 can include a physical connection between the respective components 18, 20, such as a wired connection including Ethernet, or can include wireless transmission connections, including, but not limited to, WiFi (e.g. 802.11 networks), Bluetooth, and the like. Collectively, the aircraft computers 18, LRUs 20, data transmission pathways 22, and network switches 16 can form an avionics data network for the aircraft.

The LRUs 20 can include, for example, entirely contained systems, sensors, radios, or other auxiliary equipment to manage or operate aircraft functions. At least a set of aircraft computers 18 or LRUs 20 can, for example, generate data, which can be modified, computed, or processed prior to, or in preparation for packaging the data into data frames to be transmitted over the avionics data network by way of the data transmission pathways 22 or network switches 16. At least another set of aircraft computers 18 or LRUs 20 can, for example, consume the data transmitted over the avionics data network. In some instances, a single aircraft computer 18 or LRU 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 is merely one non-limiting example of an aircraft 10 that can be used in aspects of the disclosure described herein. Particularities of the illustrated aircraft 10 aspects, including relative size, length, number of engines, type of engines, and location of various components are not germane to the aspects of the disclosure, unless otherwise noted.

In some example components, such as the aircraft computers 18 or LRUs 20, the components can be removably fixed to the aircraft for maintenance, diagnostics, or repair purposes, but statically fixed during, for example, flight. Additionally, while aircraft computers 18 and LRUs 20 are described, any data generating or data receiving or consuming components fixed relative to an aircraft can be included as aspects of the disclosure as fixed components. For example, systems such as a flight management system, primary flight display, cockpit display system, autopilot, or auto-land systems can be considered fixed components, as used herein.

Time-critical communication between end devices in data networks commonly include data traffic or transmissions, also known as "data flows" or simply, "flows." For example, data flows can comprise datagrams, such as data packets or data frames. Each data flow is unidirectional, going from a first or source end device to a second or destination end device in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a first set of data flows between the interconnected devices can be defined. For example, the first set of data flows can be between the interconnected devices. Ethernet switches (commonly called "bridges") transmit and receive the data (for example, Ethernet data frames) in a data flow based on a schedule. The bridges and end devices must be synchronized to ensure the schedule for the data flow is followed correctly throughout the network.

To achieve data transmission times with desired end-to-end latency, each data flow can be assigned a relative priority with respect to other data flows on the network. The assigned relative priority can distinguish between more important and less important network data traffic. For example, data flows having the lowest relative priority can typically be assigned a "best effort" priority (sometimes called "priority 0") for data transmission. For example, one or several of predefined legacy Ethernet priorities or TSN priorities can be individually enforced on, or assigned to, a respective data flow using existing methods (such as the IEEE 802.1Q strict priority scheduler, IEEE 802.1Qav credit-based traffic shaper, IEEE 802.1Qbv time-aware shaper, or IEEE 802.1Qcr asynchronous shaper).

It will be appreciated that the data communication network and each bridge and end device (sources and destinations) or nodes in the data communication network can be constrained by a different respective data transmission bandwidth. As used herein, the "data transmission bandwidth" can refer to a data processing capability or an allocated data processing capability (e.g., represented in bits/second), such as a bandwidth capability to transmit data or receive data, of a respective network, component, element, unit, node, hub, switch, bridge, end station, end system, control, module, pathway, or combinations thereof. The data processing capability can include a data consumption bandwidth, a data reception bandwidth, a data transmission bandwidth, or any other data processing activities and combinations thereof without departing from the scope of the disclosure herein.

Figure 2:
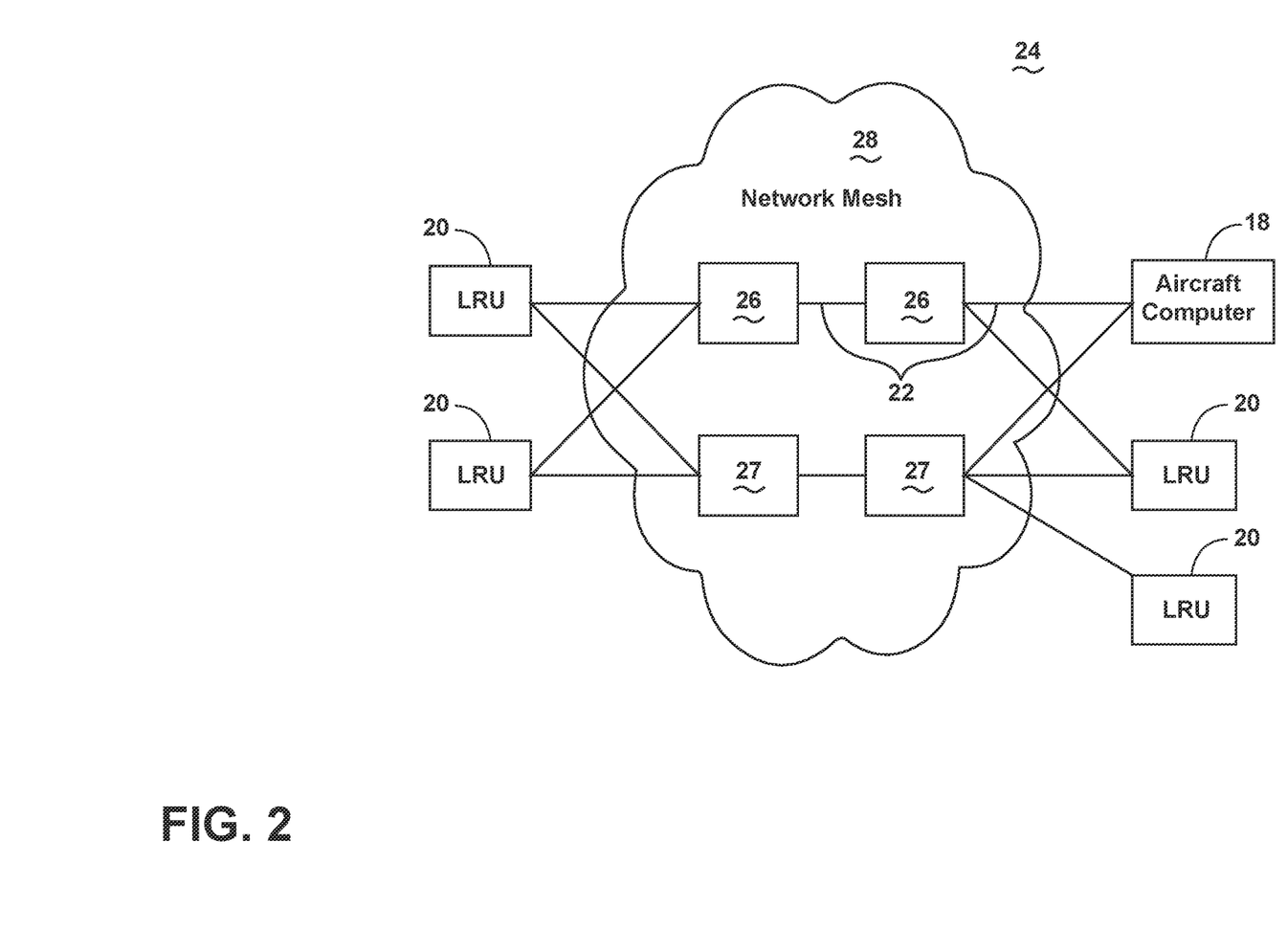
FIG. 2 is a schematic view of an example avionics data network, in accordance with various aspects described herein.

FIG. 2 illustrates a non-limiting schematic view of an avionics data network 24, according to aspects of the disclosure. In non-limiting aspects, the avionics data network 24 can include, but is not limited to, a set of redundant network bridges or switching units, such as a set of first network switching units 26 defining a first path and a set of second network switching units 27 defining a second, or redundant, path. The set of first network switching units 26 and the set of second network switching units 27 collectively define a network mesh 28 for routing the transmission of data (e.g., data frames) to and from the aircraft computer 18 and LRUs 20, via the data transmission pathways 22. The network mesh 28 is further shown having a set of data transmission pathways 22 between the first network switching units 26 and LRUs 20 to provide redundancy in data transmission pathways 22. In one non-limiting example, the network mesh 28, the set of first network switching units 26, the set of second network switching units 27, or a combination thereof, can be arranged, configured, or otherwise enabled to utilize a TSN schema. The network 24 can be further configured to determine one or more first network switching units 26 to shape the data traffic for transmission on the data transmission pathways 22.

The aspects of the disclosure illustrated in FIG. 2 are merely one representation of the avionics data network 24, and alternative configurations, organization, and component quantities, including, but not limited to, aircraft computers 18, LRUs 20, or first network switching units 26, are envisioned.

Figure 3:
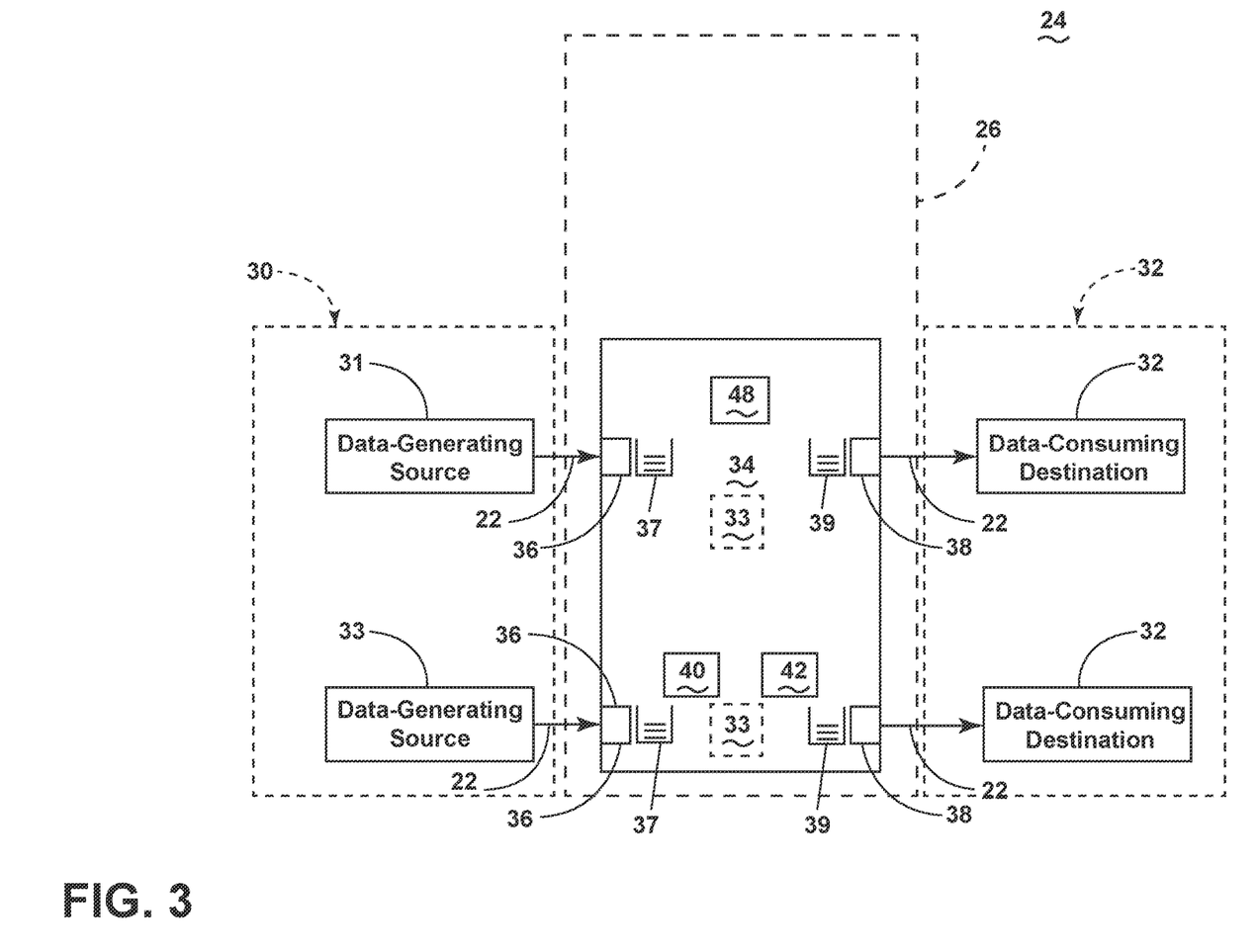
FIG. 3 is a schematic view of a network switch of a converged avionics data network, in accordance with various aspects described herein.

Turning now to FIG. 3, a simplified avionics data network 24 is illustrated, comprising a first set of networking end nodes 30 communicatively coupled to a second set of networking end nodes 32. As depicted, the first set of networking end nodes 30 can be a set of data-generating sources, and the second set of networking end nodes 32 can be a set of data-consuming destinations. The first set of networking end nodes 30 can be communicatively coupled to the second set of networking end nodes 32 by way of one or more first network switching units 26 via corresponding data transmission pathways 22. While FIG. 3 depicts, for ease of description and understanding, only a single first network switching unit 26, it will be understood that any number of, or subset of, the first network switching units 26 of the avionics data network 24 can be further included or configured, as shown. Moreover, as explained above, the data-generating sources of the first set of networking end nodes 30 or data-consuming destinations of the second set of networking end nodes 32 can include any of the aforementioned aircraft computers 18 or LRUs 20, and can be referred to herein as sources 30 or destinations 32 to provide a directional description of the data transmission. In this sense, each of the sources 30 or destinations 32 can be considered a networking end node 30, 32.

Additionally, the first set of networking end nodes 30 can include a first subset of networking end nodes 31 configured for a first schema, and a second subset of networking end nodes 35 configured for a second schema. For example, in an aspect, the first subset of networking end nodes 31 can be configured to be compliant with one or more of legacy Ethernet specifications, and referred to herein as legacy Ethernet end nodes 31. In other aspects, the first subset of networking end nodes 31 can be configured to be compliant with one or more of TSN standards and be referred to herein as TSN end nodes 31. In an aspect, the second subset of networking end nodes 35 can be configured to be compliant with one or more of TSN standards and be referred to herein as TSN end nodes 35. In other aspects, the second subset of networking end nodes 35 can be configured to be compliant with one or more of legacy Ethernet specifications and be referred to herein as legacy Ethernet end nodes 35. In some aspects, the first and second schema can be the same schema.

The first network switching unit 26 can further comprise a switch core 34 having a set of ingress ports 36, a set of egress ports 38, switching logic 40, a controller module 42, and a shaper module 48. In non-limiting aspects, the controller module 42 can include the shaper module 48. Each ingress port 36 can include a respective ingress memory buffer 37, and each egress port 38 can include a respective egress memory buffer 39 or egress port queue. The memory size and capabilities of the respective memory buffers 37, 39 can vary, as desired.

The switch core 34 can be configured to be communicatively coupled with the first set of networking end nodes 30 via the data transmission pathways 22 received at respective ingress ports 36 of the switch core 34. The first set of networking end nodes 30 are configured to supply, deliver, send, or otherwise transmit networking data, network communications, data frames, data packets, or the like (hereafter, "data frames 33"), to the switch core 34. In various aspects, the networking end nodes of the first set of networking end nodes 31 can be compliant with either legacy Ethernet schema, or TSN schema, or both. Likewise, in various aspects, the networking end nodes of the second set of networking end nodes 32 can be compliant with either legacy Ethernet schema, or TSN schema, or both. It will be further appreciated that in some aspects, the networking end nodes of the first subset of networking end nodes 31 can transmit data frames 33 in accordance with legacy Ethernet schema, and the end nodes of the second subset of networking end nodes 35 can transmit data frames 33 in accordance with a TSN schema. Additionally, the switch core 34 can be compliant with TSN schema and communicatively coupled with the data-consuming end nodes of the second set of networking end nodes 32 via the data transmission pathways 22 received in the respective egress ports 38 of the switch core 34 and transmit data frames 33 to one or more of the second set of networking end nodes 32 from the switching switch core 34. It will be understood that the data frames 33 can include at least a portion of data defining the respective networking end node 30 source of the respective data frame 33, as well as the predetermined data-consuming destination or destinations of the second set of networking end nodes 32 of the respective data frame 33.

As shown, the switch core 34 provides a respective ingress port 36 or egress port 38 for the data-generating sources of the first set of networking end nodes 30 or data-consuming destinations of the second set of networking end nodes 32, however alternative configurations are envisioned. For example, one alternative configuration envisions a single ingress or egress port 36, 38 is configured to couple with another first network switching unit 26, and can thus carry data frames 33 for any data-consuming destination of the second set of networking end nodes 32 coupled with the another first network switching unit 26. In this sense, in non-limiting aspects, the switch core 34 can be in, for example, unidirectional communication with the data-generating sources of the first set of networking end nodes 30 (i.e. only receiving data frames 33 from the source or networking end node 30) and data-consuming destinations of the second set of networking end nodes 32 (i.e. only transmitting data frames 33 to the destination or networking end node 32).

A first set of data transmission pathways 22 and ingress ports 36 or egress ports 38 of the switch core 34 can be defined by a particular pathway or communication schema utilized, for example, the legacy Ethernet schema. For instance, when the transmission pathway 22 is an Ethernet link or cable, the set of ingress ports 36 and set of egress ports 38 can include physical interfaces, such as Ethernet ports configured to operate at, for example, 10/100 or Gigabit per second (or faster) bandwidth speeds over copper or optical media. In another instance when the data transmission pathway 22 is a wireless transmission, the set of ingress and egress ports 36, 38 can be one or more antennas. A second set of data transmission pathways 22 and ingress or egress ports 36, 38 of the switch core 34 can alternatively or additionally be defined by a different particular data transmission pathway 22 or communication schema utilized, for example, a TSN schema. Furthermore, in yet another non-limiting example, the first network switching unit 26 can be configured or adapted to utilize the TSN schema on at least a portion of the ingress or egress ports 36, 38, and thus, incorporating aspects of the disclosure to enable or otherwise facilitate legacy communications with otherwise incompatible transmission of data frames 33. In the non-limiting example described, the legacy Ethernet communications or data frames 33 generated by legacy Ethernet schema data-generating sources of the first subset of networking end nodes 31, or consumed by legacy Ethernet schema data-consuming destinations of the second set of networking end nodes 32, can be communicated or transmitted via a TSN schema first network switching unit 26 via the TSN schema switch core 34. Additionally, the TSN schema data frames 33 generated by TSN schema data-generating sources of the second subset of networking end nodes 35, or consumed by TSN schema data-consuming destinations of the second set of networking end nodes 32, can be communicated or transmitted via the TSN schema first network switching unit 26 via a TSN schema switch core 34.

The switching logic 40 and the controller module 42 of the switch core 34 can operate together to route the data frames 33 of or through the switch core 34, as needed. For example, the controller module 42 can further include a processor and suitable memory for including a portion of a computer program having an executable instruction set for controlling the operation of the controller module 42 or switching logic 40. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc. that have the technical effect of performing particular tasks or implement particular abstract data types. In implementation, the one or more functions or routines of the controller module 42 can be converted to a computer program comprising a set of executable instructions, for execution by the controller or controller module 42.

The controller module 42 can be configured to determine characteristic information associated with the set of data frames 33. In non-limiting aspects the determining characteristic information associated with the data frames 33 can include determining the respective schema of the set of data frames 33. For example, the controller module 42 can be configured to determine whether the received data frame 33 is a legacy Ethernet schema data frame (e.g., generated by a legacy Ethernet schema data generating source of the first subset of networking end nodes 31), or a TSN compatible data frame 33 (e.g., generated by a TSN schema data generating source of the second subset of networking end nodes 35). In one instance, the controller module 42 can determine the respective schema of a data frame 33 based on the particular transmission pathway 22 or ingress port 36 utilized to transmit the data frame 33 to the switch core 34. For example, in an aspect, a particular data transmission pathway 22 can be reserved or dedicated to transmitting data frames 33 associated with a predetermined schema (e.g., a legacy Ethernet schema), while another particular data transmission pathway 22 can be reserved or dedicated to transmitting data frames 33 associated with another predetermined schema (e.g., a TSN schema).

In other aspects, the controller module 42 can determine the respective schema of the data frames 33 based on the particular data generating source of the first set of networking end nodes 30 that provided the data frame 33. For example, in an aspect, a particular data generating source of the first set of networking end nodes 30 can be compliant with a predetermined schema (e.g., a legacy Ethernet schema) and configured to provide data frames 33 in accordance with the predetermined schema. Upon receipt of a data frame 33, the controller module 42 can determine or identify the particular data generating source of the first set of networking end nodes 30 that provided the data frame 33, (for example, by using a look-up table) and thereby determine the respective schema of the received data frame 33 based on the determined data generating source of the first set of networking end nodes 30. In some aspects, the controller module 42 can determine the respective schema of the received data frame 33 based on a media access control (MAC) address of the data generating source of the first set of networking end nodes 30. In still other aspects, the controller module 42 can likewise determine the respective schema of a data frame 33 based on the intended or ultimate data consuming destination of the second set of networking end nodes 32 of the data frame 33. For example, the controller module 42 can determine the respective schema of the received data frame 33 based on a media access control (MAC) address of the data consuming destination of the second set of networking end nodes 32 of the data frame 33.

In non-limiting aspects, the controller module 42 can be configured to determine the respective schema of the data frames 33 based on predetermined information or data within the data frame 33. In a non-limiting aspect, the controller module 42 can determine the respective schema of the received set of data frames 33 based at least partially on information in an Ethernet header of the data frame 33. In still other aspects, the controller module 42 can be configured to determine the respective schema of the received set of data frames 33 based on a predetermined pattern, such as a byte pattern, in a portion of the data within the data frame 33.

In further non-limiting aspects, the determining the characteristic information associated with the data frames 33 can include determining, with the controller module 42, the intended data-consuming destination or networking end node 32 for the data frames 33 supplied to an ingress port 36 of the switch core 34. In an aspect, the controller module 42 can determine the intended destination or networking end node 32 for a data frame 33 based at least partially on the data within the data frame 33. The controller module 42 can then command the switching logic 40 to route and forward the data frame to the egress port 38 (or an associated egress memory buffer 39 thereof) associated with the determined destination networking end node 32 of the second subset of networking end nodes 32 for delivery thereto. For example, in an aspect, the controller module 42 can determine the destination networking end node 32 based on the MAC address of the determined destination networking end node 32 of the data frame 33.

In still further non-limiting aspects, the determining characteristic information associated with the data frames 33 can include determining with the controller module 42, a data transmission bandwidth of the intended destination networking end node 32. For example, in an aspect, the controller module 42 can determine the data transmission bandwidth of the destination networking end node 32 by using a look-up table. In other aspects, information indicative of the data transmission bandwidth of the destination networking end node 32 can be included in the data frame 33.

In non-limiting aspects, the determining characteristic information associated with the data frames 33 can include determining, with the controller module 42, a relative priority of the data frames 33. For example, in an aspect, the controller module 42 can determine the relative priority of the data frames 33 based on information in the data frames 33 indicative of an assigned priority. For example, the assigned priority of a legacy Ethernet data frame 33 can be included in a Priority Code Point (PCP) field in the data frames 33.

It will be appreciated that in non-limiting aspects, the data avionics data network 24 can be designed to meet a predefined or desired Quality of service (QoS) parameter with respect to data transmission performance. As used herein, the "QoS" is a description or measurement of an overall data delivery performance of the network. For example, the QoS can be a quantitatively measured quality of service, based on one or more attributes including but not limited to packet loss, bit rate, throughput, transmission delay, availability, jitter, etc., and combinations thereof. In some instances, the determined or assigned priority of data flows from a legacy Ethernet end node can be assigned a best effort priority. It will be understood that conventional data communication networks are not typically configured to provide any guarantee that data flows assigned a best effort priority will meet any desired QoS, or, in some cases, even be delivered at all.

However, in non-limiting aspects, the controller module 42 can be further configured to modify a first priority of a data frame 33 to be a second priority. For example, in an instance wherein a legacy Ethernet data frame 33 is assigned a first priority that is a best effort priority, the controller module 42 can be configured to modify the first priority of the data frame 33 to be a second priority that is a higher priority than the first priority in order to meet a QoS parameters for the TSN schema data network 24.

In non-limiting aspects, the controller module 42 can be further configured to tag, mark, flag, or otherwise provide an indication within the data frame 33 of the determined priority, modified priority, or the determined data transmission bandwidth of the destination networking end node 32, or combinations thereof.

In an instance, the controller module 42 can command the switching logic 40 to forward or move or otherwise assign the data frames 33 to a queue (i.e., a transmission queue) in the egress memory buffer 39 for transmission from the switch core 34 to an intended data-consuming destination of the second set of networking end nodes 32. In some aspects, the controller module 42 can command the switching logic 40 to forward the data frames 33 to a transmission queue in the egress memory buffer 39 by assigning the data frames 33 in real time based on the determined respective schema of the data frames 33. In other embodiments, the controller module 42 can determine the transmission queue based on source, destination, or some other information in the data frame. In other aspects, the controller module 42 can command the switching logic 40 to forward the data frames 33 to a transmission queue in the egress memory buffer 39 by assigning the data frames 33 to a predetermined queue in the egress memory buffer 39. In aspects, the controller module 42 can select the queue based on the determined schema of the data frame 33. In other aspects, the controller module 42 can select the queue based on the modified priority of data frame 33. In a non-limiting example, based on the determined schema of the data frame 33, the controller module 42 can place the received data frames 33 in a predetermined sequential first-in, first-out (FIFO) transmission queue, to retain timing or ordering priority. In some aspects, the controller module 42 can determine the transmission queue based on the source node, destination node, priority, or some other information contained in the data frame (e.g. in a header) after receiving a portion of the data frame (i.e., prior to receiving the complete data frame 33) in order to achieve low latency communication through the switch.

In non-limiting aspects, the controller module 42 can include the shaper module 48. In other aspects, the shaper module 48 can be disposed remote from, and communicatively coupled with, the controller module 42. The shaper module 48 can be configured to perform or execute shaping of the data frames 33 in the assigned queue for delivery or selective transmission to a predetermined data-consuming destination of the second set of networking end nodes 32. The shaper module 48 can be configured to provide scheduling and traffic shaping of the data flows to thereby enable different dataflows having different relative priorities to exist on the same network without conflicts. As used herein, the term "conflict" refers to a calculation, indication, identification, anticipation, estimation, or other determination, that two or more data flows would or could be present on a common link at the same time.

In aspects, the shaper module 48 can be a synchronous type, or time-aware, shaper module 48, or scheduler. In other aspects, the shaper module 48 can be an asynchronous type, or rate constrained, shaper module 48. In still other aspects, the shaper module 48 can be a priority-based shaper such as a strict priority shaper. For example, in an aspect wherein the shaper module 48 is a priority-based shaper, the network switch core 34 can be configured to determine a priority of a data frame 33, and the shaper module 48 can be configured to selectively schedule delivery or transmission of the data frame 33 to a predetermined destination networking end node 32 based on the priority of the data frame 33. In non-limiting aspects, the priority can be one of the first priority and the second priority.

Regardless of the type of shaper module 48 used, the shaper module 48 can selectively schedule a delivery or transmission of the data frames 33 in an assigned queue to a predetermined data consuming destination of the second set of networking end nodes 32 using any number of predetermined parameters or rules. For example, the predetermined rules can be selected to ensure a desired QoS parameter is met. For example, in non-limiting aspects, the shaper module 48 can be configured to schedule the delivery of data frames 33 in an assigned queue in the egress memory buffer 39 in accordance a TSN schema (for example, in compliance with IEEE Standard 802.1 Qbv). In such an aspect, the shaper module 48 can comprise a time-aware type shaper (TAS) as defined in IEEE 802.1Q-2018 and can include a predefined cycle time.

In other aspects, the shaper module 48 can be programmed to shape the data frames 33 for a transmission to meet a predetermined effective data rate requirement the originating networking end node 32, 35.

It is contemplated that in aspects, each end node the first subset of networking end nodes 31 and the second subset of networking end nodes 32 can be constrained by a respective data transmission bandwidth or data reception bandwidth. In aspects, the respective data transmission bandwidth or data reception bandwidth of a particular originating node 31, 35 and an intended destination networking node 32 can be different from each other. For example, in non-limiting aspects, an originating legacy Ethernet end node 31 can be configured transmit a set of data frames 33 in a transmission burst (i.e., having a relatively high peak data rate over a relatively short time duration with respect to a cycle time of the network). In some instances, such a transmission burst can exceed the respective data transmission bandwidth of an intended destination networking end node 32. In such aspects, the shaper module 48 can be configured to shape the transmission of the data frames 33 from the originating end node 31 to limit a transmission burst of the set of data frames 33 based on the determined (e.g., by the switch core 34) data transmission bandwidth constraint of the destination networking end node 32.

In other non-limiting aspects, the shaper module 48 can control the delivery of data frames 33 based on a predetermined set of parameters having predefined values. The predetermined parameters can be selected to meet a predefined or desired system QoS performance parameter. By way of non-limiting example, the predetermined set of parameters can include, without limitation, any one or more of a predetermined cycle time (e.g., based on a predetermined time period over which a transmission gate (not shown) associated with each transmission queue of the switch core 34 opens and closes to transmit and prevent transmission, respectively, of the data frames 33), average interarrival time (i.e., the average time duration between two consecutive data frames 33), peak data rate, a time limit for transmitting the data frame 33 from the transmission queue in the egress memory buffer 39 to an intended data-consuming destination of the second set of networking end nodes 32, predetermined gate control logic, predetermined gate states, administrative base time, or various combinations thereof.

In some non-limiting aspects, the shaper module 48 can be a time-aware type shaper module 48 employing a predetermined cycle time in compliance with IEEE Standard 802.1 Qbv. For example, the shaper module 48 can be configured to schedule delivery of received data frames 33 to the respective intended data consuming destination of the second set of networking end nodes 32 to occur within the same cycle in which the respective data frame 33 was transmitted by a data generating source of the first subset of networking end nodes 31. In this way, the shaper module 48 can schedule the delivery of data frames 33 from the transmission queue in egress memory buffer 39 such that a latency of any data frame 33 does not exceed a predetermined cycle time.

In other aspects, the legacy Ethernet schema end nodes of the first subset of networking end nodes 31 can be configured to group the transmission of data frames 33 (e.g., break apart their transmission) into different streams such that longest transmission from any end node of the first subset of networking end nodes 31 does not exceed the smallest frame interarrival time of any other of the first subset of networking end nodes 31, when the transmissions from those two networking end nodes to their respective destinations share a common link or data transmission pathway 22 between them.

It is also contemplated that, in some aspects, a networking end node 31, 35 of the first set of networking end nodes 30 can alternatively be configured to shape a set of data frames 33 for transmission without need of the shaper module 48 at first network switching unit 26. In such aspects, the end nodes 31, 35 can comprise one of a synchronous, asynchronous, or priority-based shaper. For example, the end node 31, 35 can include a synchronous shaper and be configured to determine schedule for the delivery of the set of data frames 33 prior to the transmission of the set of data frames 33 by the end node 31, 35.

The shaper module 48 can implement, perform, or execute the shaping and scheduling functions with a processing module that functions with software programs, firmware or other computer readable instructions for carrying out various methods, process tasks, calculations, and control functions, used in the scheduling functions.

In another non-limiting instance, the controller module 42 can be adapted or configured to determine whether the legacy Ethernet data frames 33 received from data-generating sources of the first subset of networking end nodes 31 can be delivered or communicated by the TSN schema first network switching unit 26 or switch core 34. In this sense, and in accordance with the TSN schema, the controller module 42 can receive, or define a time-based allocation for delivering legacy Ethernet schema and TSN schema network traffic in accordance with the TSN schema. Also in accordance with a TSN schema, the time-based allocation for delivering network traffic (e.g., data frames 33) can be at least partially based on allocated time slots for particular message delivery (e.g. specific data, or specific communications between at least one data-generating source of the first set of networking end nodes 30 or data-consuming destination of the second set of networking end nodes 32 is allocated a specific portion of time on the network to deliver related network traffic) or unallocated time slots (wherein no specific data or communications are allotted to the respective time slot for delivery). In non-limiting examples, the allocated and unallocated time slots can be dynamically configured (e.g. at startup), manually configured (e.g. in firmware), or defined by a component of the network, including but not limited to the first network switching unit 26, the switch core 34, the controller module 42, another networking component, or a combination thereof.

In some aspects, instead of determining, with the controller module, a schedule for the transmission of the set of data frames, the schedule for the transmission of the set of data frames can be pre-determined by any other device as desired and provided to the controller module 42. For example, the controller module 42 can be provided (e.g., from an external controller, not shown) with a pre-determined schedule for the transmission of the set of data frames 33 prior to receiving the set of data frames 33. In non-limiting aspects, in addition to determining the respective schema of the received set of data frames 33, the controller module 42 can be provided with a pre-determined schedule for the transmission of the set of data frames that is based on the determined schema.

In other aspects, in addition to determining the respective schema of the received set of data frames 33, the controller module 42 can also be configured to identify unallocated, or even under-utilized allocated time slots, and arrange, provide for, enable, or otherwise ensure that legacy Ethernet data frames 33 are delivered by way of the TSN schema first network switching unit 26 or switch core 34 during those unallocated under-utilized allocated time slots. In other aspects, the controller module 42 can be provided with a schedule for the transmission of the set of data frames based on predetermined unallocated time slots. For example, the unallocated time slots can be determined prior to receiving the set of data frames 33.

In another non-limiting example, the controller module 42 can facilitate the legacy Ethernet data frame 33 delivery by commanding, instruction, controllably delivering, or otherwise selectively scheduling the delivery of at least a subset of the data frames 33 by way of the switching logic 40 or controller module 42 of the switch core 34. In yet another non-limiting example, the controller module 42 can facilitate or prepare for the delivery, if for example, the selectively scheduled delivery is during a future time period, by arranging or enabling the legacy Ethernet data frames 33 to be copied into the egress memory buffer 39.

In an aspect, the switch core 34 can be configured to support one or more of a TSN schema frame replication and elimination for reliability functions. For example, the data frames 33 sent from the second subset of networking end nodes 35 can comprise TSN schema redundant data frames 33. In a non-limiting aspect, the switch core 34 can be configured to determine that a first redundant networking data frame 33 has been received by a networking end node of the second set of networking end nodes 32, and if so, to block, or otherwise prevent a second redundant networking data frame 33 (i.e., identical to the first redundant networking data frame 33) from being transmitted to the networking end node of the second set of networking end nodes 32.

Upon reaching the selectively scheduled time slot, the switch core 34 or the first network switching unit 26 can operably deliver the legacy Ethernet frames 33 from the egress port(s) 38 to another legacy Ethernet based networking end node, such as one or more of the set of data-consuming destinations 32 of the second set of networking end nodes 32. In other aspects, the switch core 34 can operably deliver the legacy Ethernet frames 33 to a TSN networking end node, such as one or more of the set of data-consuming destinations 32 of the second set of networking end nodes 32.

In another non-limiting example, aspects of the disclosure can be included wherein the switch core 34 can be further configured to determine or ensure a respective legacy Ethernet data frame 33 can be completely delivered (e.g. fully, without truncating) during the selected delivery time slot. For instance, if a set of data frames 33 have been queued (e.g. in the egress memory buffer 39), a subset of data frames 33 may not be deliverable based on the time slot. The switch core 34 can be configured to estimate, predict, determine, or otherwise allocate a set of data frames 33 that are sure to be delivered in the selected time slot, and either hold, retain, buffer, exclude, or drop data frames 33 that are determined to be not deliverable or not completely deliverable during the selected time slot. In one non-limiting example, the delivery of the legacy Ethernet data frames 33 can be based on a first-in, first-out (FIFO) arrangement.

Once scheduled, the data frames 33 can be transmitted, by the switch core 34, to an end node of the second set of networking end nodes 32 having a corresponding schema. In an aspect, the switch core 34, can transmit the set of data frames 33, without modification of the set of data frames 33, to a data consuming end node of the second set of networking end nodes 32 having a corresponding schema. In this sense, aspects of the disclosure can enable or allow for the delivery of at least a subset of legacy Ethernet data frames 33 by way of a TSN based network schema. It will be appreciated that aspects of the disclosure can likewise enable or allow for the delivery of at least a subset of TSN data frames 33 by way of the TSN based network schema.

Figure 4:
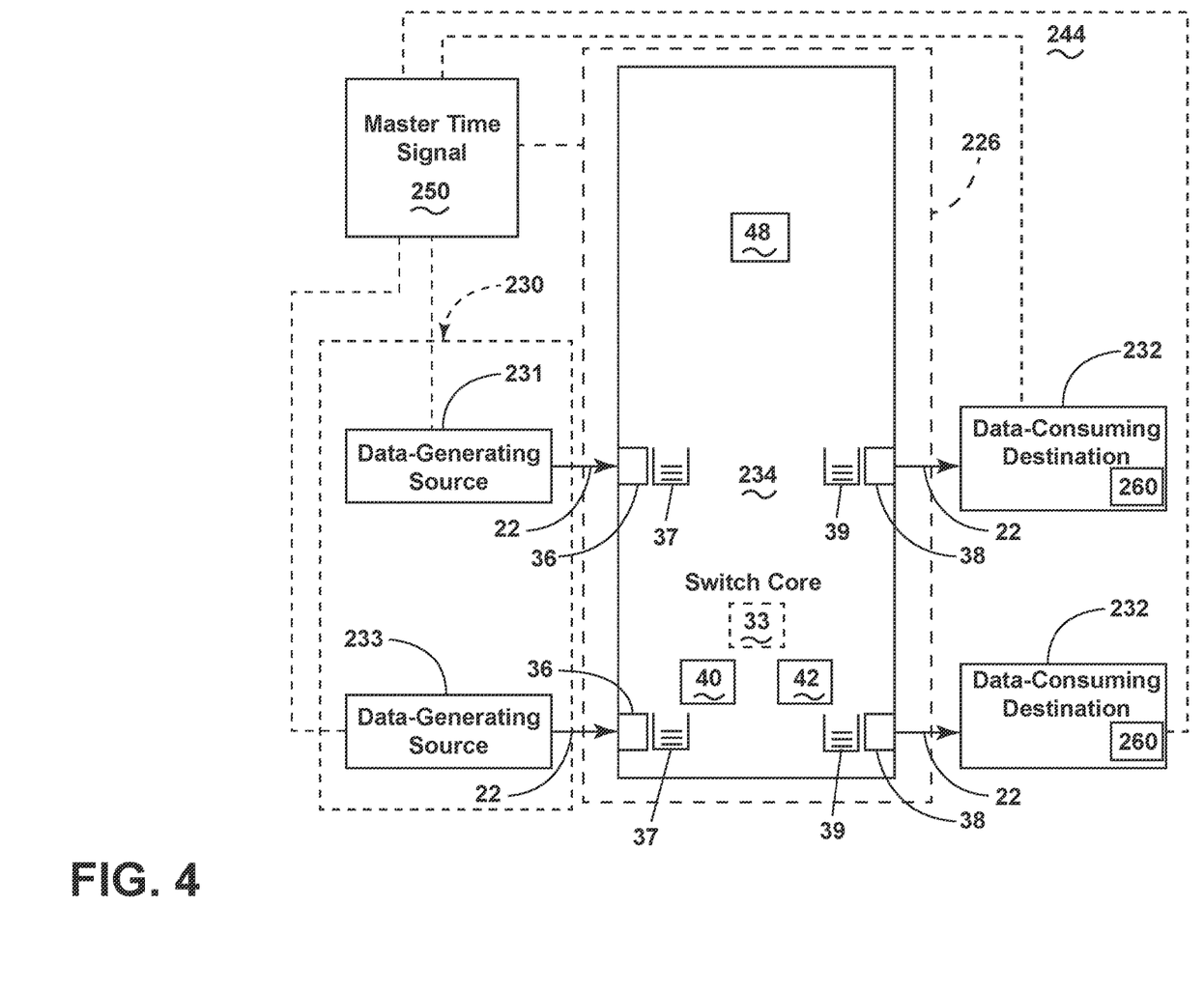
FIG. 4 is a schematic view of a network switch of a converged avionics data network having a master time signal, in accordance with various aspects described herein.

FIG. 4 illustrates another avionics data network 224 according to another aspect of the present disclosure. The avionics data network 224 is similar to the avionics data network 24, therefore, like parts will be identified with like numerals increased by 200, with it being understood that the description of the like parts of the avionics data network 24, applies to the avionics data network 224, unless otherwise noted. One difference is that the avionics data network 224 can include a master time signal 250 that is provided to at least a subset of the following components: the data-generating sources of the first set of networking end nodes 230, the data-consuming destinations of the second set of networking end nodes 232, or the first network switching unit 226. In this sense, the subset of components 226, 230, 232, 235 can receive a time synchronization value (e.g. a "master time") from the master time signal 250 for at least partial synchronization of operations. Another difference, as discussed in more detail herein, is that the data-consuming destinations of the second set of networking end nodes 332 can further include a reassembly module 260.

In one non-limiting example, the first subset of networking end nodes 231 can be configured or adapted to transmit, send, or provide legacy Ethernet data frames 33 during a predetermined schedule, managed or regulated by the time synchronization value. In another non-limiting example, the first subset of the data-generating sources 231 can be configured or adapted to store locally (e.g. at the data-generating source, for instance in a memory buffer, not shown), and to send the locally stored legacy Ethernet data frames 33 during the predetermined schedule.

In other aspects, the data-consuming destinations of the second set of networking end nodes 232 or the first network switching unit 226 can be configured or adapted to enable the splitting or separation of a single legacy Ethernet schema, or a TSN schema, data frame 33 into a set of data frames 33 or messages to be reassembled at a later time or at a downstream destination.

For example, aspects of the disclosure can be included wherein the switch core 234 can be further configured to determine or ensure a respective legacy Ethernet data frame 33 can be completely delivered (e.g. fully, without truncating) during the selected delivery time slot. Aspects can be adapted or configured to determine whether a respective legacy Ethernet data frame 33 can be completely delivered during the selected delivery time slot, and if not, to separate the respective legacy Ethernet data frame 33 into a first legacy Ethernet networking message and a second A664 networking message. In this example, the first legacy Ethernet networking message can be scheduled for delivery, while the second legacy Ethernet networking message can be further scheduled during the next unallocated or available time slot.

The data-consuming destination of the second set of networking end nodes 332 can optionally further include a reassembly module 260 that can be adapted or configured to receive each of the first and second legacy Ethernet networking messages, and reassemble them to the original legacy Ethernet data frame 33.

Figure 5:
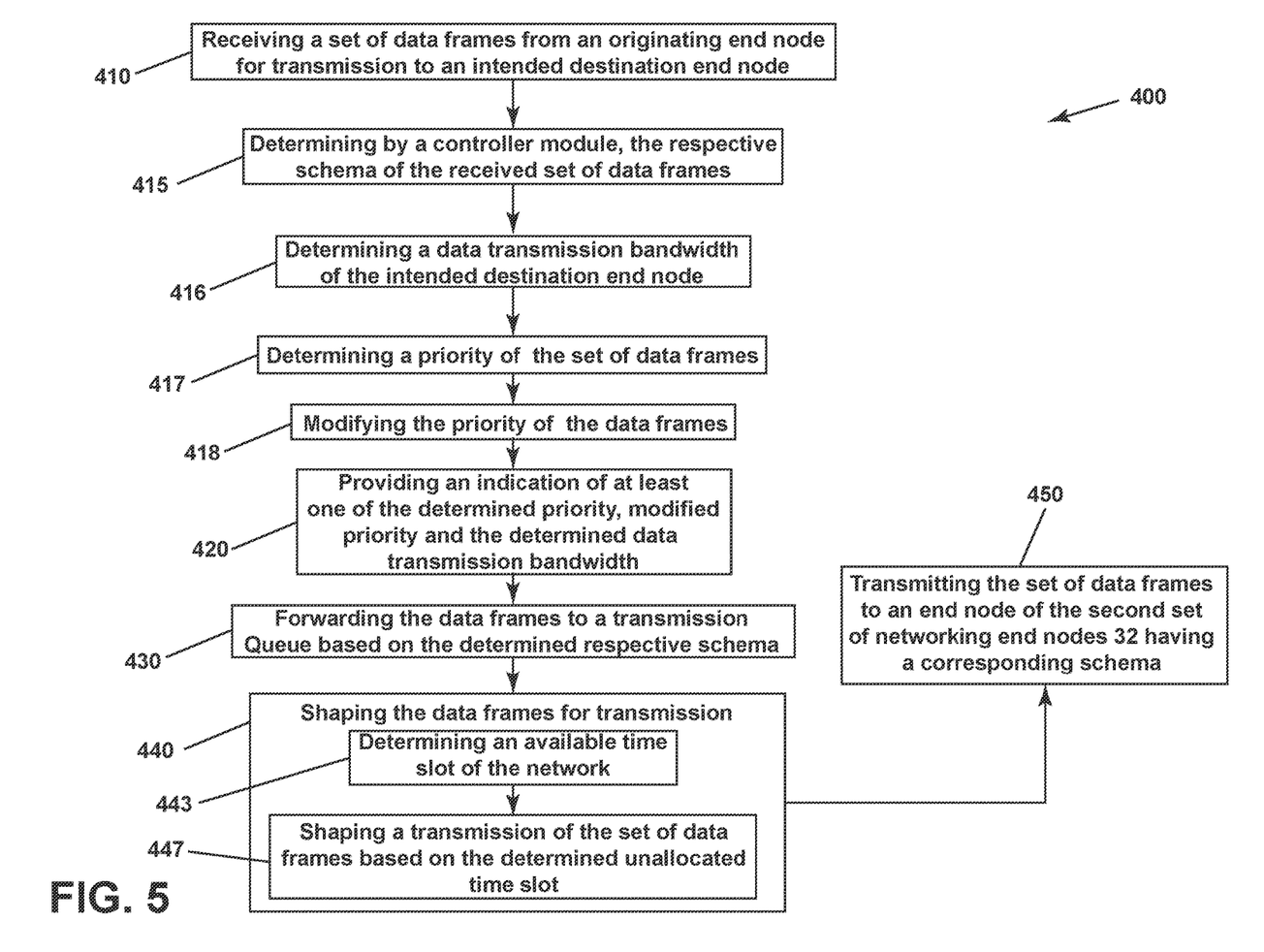
FIG. 5 is a flow chart showing a method of operating a converged avionics data network, in accordance with various aspects described herein.

FIG. 5 illustrates a flow chart demonstrating a method 400 of operating an avionics data network 24. The method 400 begins by receiving, at a set of ingress ports 36 for a network switch core 34 for a TSN schema network, a set of data frames 33 from a first set of networking end nodes 30 having a first subset of networking end nodes 31 compliant with a first schema and a second subset of networking end nodes 35 compliant with a second schema, for transmission to an intended destination networking end node 32 of the second set of networking end nodes 32 of the network 24 at 410. In an aspect, the first schema can be a legacy Ethernet schema, and the second schema can be a TSN schema. The method 400 includes determining, by a controller module 42 the respective schema of the received set of data frames 33, at 415. The method 400 can optionally include determining by a controller module 42 a data transmission bandwidth of the intended destination networking end node 32 of the second set of networking end nodes 32 at 416. In non-limiting aspects, the method 400 can further optionally include determining a priority of the set of data frames 33 at 417. Some aspects of the method 400 can include modifying the priority of the data frames 33 to define a modified priority of the data frames 33, at 418.

The method 400 can include at 420, providing an indication within the data frame 33 of at least one of the priority of the set of data frames 33, modified priority of the set of data frames 33, and the data transmission bandwidth of the destination networking end node 32. The method 400 includes forwarding the data frames 33 to a transmission queue based on the determined respective schema, at 430. In an aspect, the transmission queue can be determined prior to receiving the data frames 33. At 440, the method 400 includes shaping the data frames 33 for transmission based on the determined transmission queue, using one of a synchronous shaper and asynchronous shaper. For example, in a non-limiting aspect the shaper can be a time-aware shaper. In non-limiting aspects, the shaping of the data frames 33 for transmission can include selectively scheduling the transmission of the data frames 33 to a data consuming destination of the second set of networking end nodes 32 based on a predetermined schedule. The shaping of the data frames 33 for transmission can include shaping the data frames 33 for transmission to limit a transmission burst of the set of data frames 33 based on the data transmission bandwidth constraint of the destination networking end node 32. Alternatively, the shaping of the data frames 33 for transmission can include shaping the data frames 33 for transmission to meet an effective data rate requirement of at least one networking end node of the first set of networking end nodes 30. In other aspects, the shaping of data frames 33 for transmission can include shaping the data frames 33 for transmission to meet one or more QoS parameter of the data flow, such as data rate, latency, and jitter.

In some aspects, the scheduling at 440 can include determining, an available or unallocated time slot of the TSN schema network, at 443. In non-limiting aspects, the determining an unallocated time slot of the TSN schema network can be done prior to receiving the data frame 33. In an aspect information indicative of the unallocated time slot can be provided to the network switch core 34 prior to receiving the data frames 33. The method 400 can include selectively shaping, by the controller module 42 a transmission of the set of data frames 33 based on the determined unallocated time slot, at 447. The selectively shaping the set of data frames 33 can be done using a time-aware type shaper module 48. The method 400 can include transmitting, by the switch core 34, the set of data frames 33, to an end node of the second set of networking end nodes 32 having a corresponding schema. For example, the transmitting of the data frames 33 can be done during the determined unallocated time slot, at 450. In some aspects, the transmitting of the set of data frames 33, by the switch core 34, to an end node of the second set to an end node of the second set of networking end nodes 32 having a corresponding schema can be done without modification of the set of data frames 33.

The sequence depicted is for illustrative purposes only and is not meant to limit the method 400 in any way as it is understood that the portions of the method 400 can proceed in a different logical order, additional or intervening portions can be included, or described portions of the method 400 can be divided into multiple portions, or described portions of the method 400 can be omitted without detracting from the described method 400. For example, the method 400 can further include determining, by the switch core 34, whether at least a subset of the data frames can be completely delivered during the next available unallocated time slot, or delivering the set of data frames further includes delivering the subset of the data frames determined to be completely delivered during the next available unallocated time slot. In yet another example aspect of the method 400 can include shaping of the set of data frames 33 for transmission using an asynchronous shaper at 440. In such an aspect, the shaping of the set of data frames 33 for transmission can include determining an available credit and selecting one or more data frames 33 for transmission based on available credit.

Figure 6:
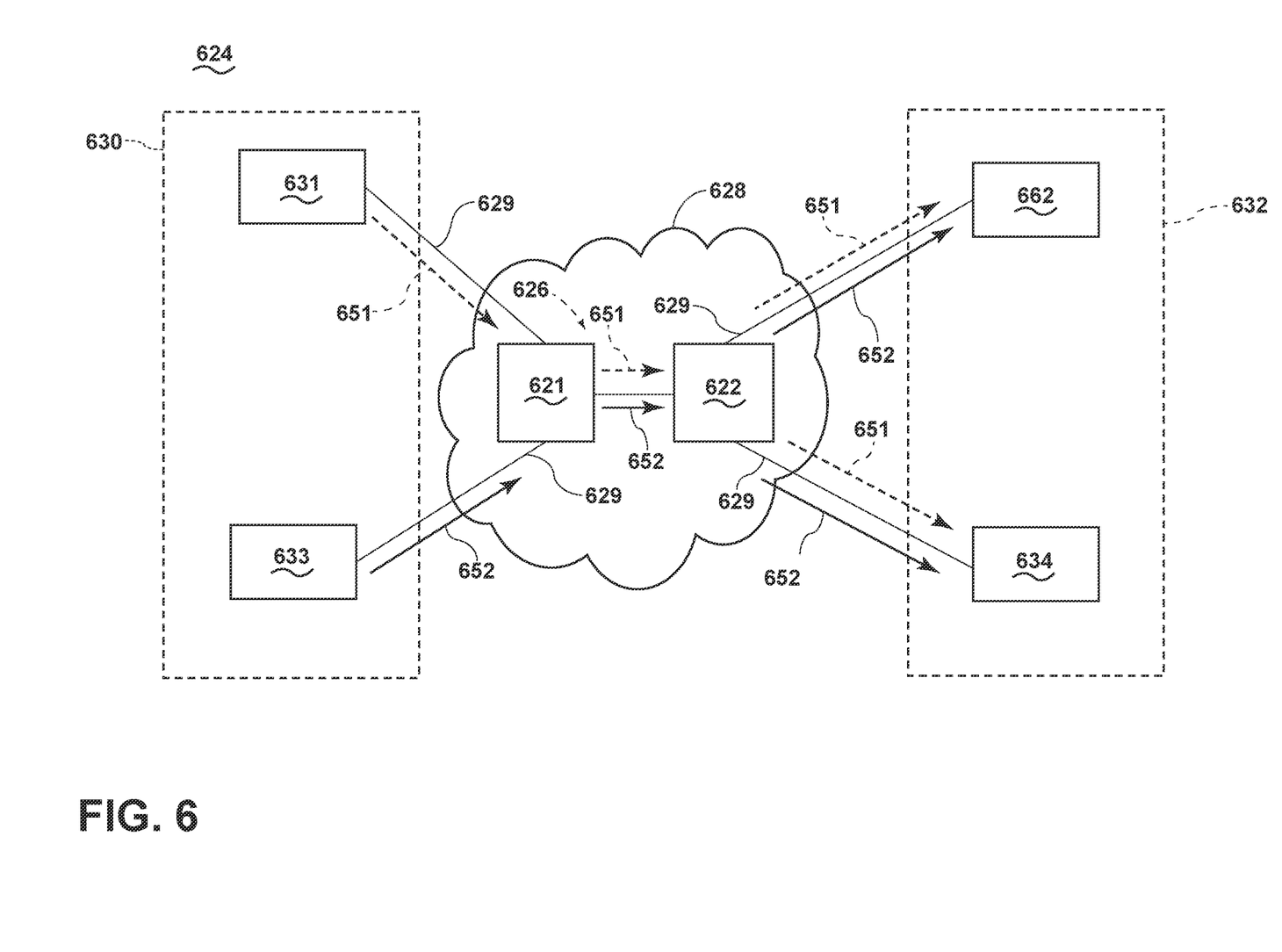
FIG. 6 is a schematic view of an example of an avionics data network, in accordance with various aspects described herein.

FIG. 6 depicts a schematic view of another non-limiting example of a particular converged avionics data network 624, in accordance with various aspects described herein. By way of a providing a clearer understanding of the operation of such various non-limiting aspects, a description of an exemplary operation thereof will be provided. It will be appreciated that the example provided is only one such possible instance of non-limiting aspects as disclosed herein, and other aspects are not so limited.

The converged avionics data network 624 can include a set of first networking end nodes 630, a set of second networking end nodes 632 and a set of network switching units 626. The first set of networking end nodes 630 can include a first end node 631 and a third end node 633, and the second set of networking end nodes 632 can include a second end node 632 and a fourth end node 634. In this example, converged avionics data network 624 and the first and second end nodes 631, 632 can operate in conformance to a TSN schema, while the third and fourth end nodes 633, 634 can operate in conformance with a legacy Ethernet schema. Also, in this example, the set of network switching units 626 can include a first switching unit 621 and a second switching unit 622, both configured to operate in accordance with the TSN schema.

The set of network switching units 626 can collectively define a network mesh 628 for routing transmitted data (e.g., data frames 33) to and from the first and second sets of networking end nodes 630, 632 via a set of data transmission pathways 629. As illustrated in FIG. 6, a first data flow 651 (indicated by sequential dashed arrows) can originate from the first end node 631 intended to be received or consumed by the second end node 662 and the fourth end node 634. Additionally, a second data flow 652 (indicated by sequential solid arrows) can originate from the third end node 633 intended to be received or consumed by the second end node 662 and the fourth end node 634. The first switching unit 621 can receive data frames 33 in the first data flow 651 and the second data flow 652 from the first and third end nodes 631, 633, respectively.

In response to receiving a data frame 33, the first switching unit 621 can be configured to determine whether the data frame 33 was received from the first end node 631 or the third end node 633 based on the header information in the data frame 33. For example, in some aspects, the header information can include without limitation, one or more of a source mac address, a destination mac address, VLAN ID (e.g., a number between 0-4095), and a priority code point (PCP) or combinations thereof. In non-limiting aspects, the identity of a data flow 33, or the forwarding action for the data flow 33, or both, can be defined based on a configuration file or entry. For example, the first switching unit 621 can be configured to identify or determine that the received data frame 33 is part of the first data flow 651 by identifying a particular VLAN ID and a specific destination mac address in the data frame 33 header.

The first switching unit 621 can also be configured to determine an intended recipient or destination node for the data frame 33, as well as any needed data frame header modifications based on the schema of the determined destination end node. In this non-limiting example, the next recipient or destination node is the second switching unit 622. Since the first end node 631 and the second switching unit 622 are both configured in accordance with the TSN schema, no changes to the frame header would be needed. The first switching unit 621 can queue the data frames 33 from the first data flow 651 to a predetermined queue associated with the second switching unit 622. In this example, the first switching unit 621 can be configured to shape the first data flow 651 transmission by applying a time aware shaper (TAS). For example, the first switching unit 621 can shape the first data flow 651 transmission by holding or retaining the data frames 33 of the first data flow 651 in an egress queue, and periodically opening the queue gate for a predetermined duration to allow the transmission of one or more data frames 33. In non-limiting aspects, the shaping and transmit schedule of the first data flow 651 can be determined based on a configuration file.

In this example, since the second data flow 652 is received by the first switching unit 621 from a legacy ethernet source, (i.e., third end node 633), the first switching unit 621 can identify the data frames 33 of the second data flow 652 based on the source mac address and destination-mac-address without need of a VLAN ID. The first switching unit 621 can also determine the next recipient or destination node for the second data flow 652. In this example, since the next recipient of the second data flow 652 is the second switching unit 622, the first switching unit 621 can be configured to queue the data frames 33 from the second data flow 652 to the predetermined queue associated with the second switching unit 622. However, since the first data flow 651 and the second data flow 652 are both intended for the queue associated with the second switching unit 622, the first switching unit 621 can be configured to isolate the first data flow 651 and the second data flow 652 from each other by queueing the data frames 33 forming the legacy ethernet stream (i.e., the second data flow 652) into a separate queue. The first switching unit 621 can apply a TAS to the separate queue to restrict the number of data frames 33 per cycle time of the second data flow 652 that are allowed to egress the separate queue for transmission.

By way of non-limiting example, the first switching unit 621 can be scheduled to transmit data frames 33 from the queue associated with the second switching unit 622 for a duration of 8864 nanoseconds during every 1 millisecond cycle. In some non-limiting aspects, a data frame 33 can have a size of 1000 bytes. In such aspects, the first switching unit 621 can schedule one data frame 33 transmission per 1 millisecond, for an effective bandwidth of 8 megabytes per second (Mbps). Accordingly, in this non-limiting example, the first switching unit 621 conforming to a TSN schema can shape the data flow traffic received from a legacy ethernet source (i.e., the third end node 633) to a fixed rate of 8 Mbps by using a TAS. Additional data frames 33 can be queued in the queue associated with the second switching unit 622 and only allowed to transmit once every 1 msec. Additionally, however, because the third end node 633 is not a TSN compliant node and could potentially transmit data frames 33 in an intermittent manner, such as by undesirably transmitting bursts of data (i.e., so called "bursty traffic"), the first switching unit 621 (i.e., a TSN compliant switch) can be advantageously configured to isolate this second data flow 652 in to a queue separate from other data flows coming from TSN sources or end nodes.

The second switching unit 622 can be configured to operate in essentially the same manner as discussed above with respect to the first switching unit 621. For example, the second switching unit 622 can be configured to identify the data frames 33 associated with the respective first and second data flows 651 652, queue the data frames 33 in appropriate queues associated with the next intended recipient node, and forward the data frames 33 to the corresponding egress port in essentially the same manner as the first switching unit 621.

However, since in this example, the first data flow 651 is to be provided to both the second end node 662 and fourth end node 634, the second switching unit 622 can be configured to forward the first data flow 651 to separate respective ports associated with the second end node 662 and fourth end node 634. Additionally, since the second end node 662 in this example is compliant with a TSN schema and the fourth end node 634 is compliant with legacy Ethernet schema, the second switching unit 622 can be configured to modify the data frame 33 header in accordance with the recipient or consuming end node schema. For example, for the data frames 33 intended to be transmitted to the fourth end node 634, the second switching unit 622 can be configured to remove the VLAN ID from the data frame 33 header (e.g., set VLAN ID equal to zero) since the legacy Ethernet node (i.e., fourth end node 634) is not capable of processing the VLAN ID. The second switching unit 622 can also be configured to queue traffic in respective queues for the data ports associated with the second end node 662 and fourth end node 664, respectively, and to further apply a TAS to the respective data flows 651, 652.

It will be appreciated that in this example, the second switching unit 622 provides the second data flow 652 to two respective egress ports because each data frame 33 is being transmitted to two consumers (i.e., the second end node 632 and fourth end node 634). Furthermore, in contrast to the first switching unit 621, which had queued the second data flow 652 into a separate queue from the first data flow 651, because the second data flow 652 had originated from a legacy Ethernet source (i.e., the third end node 633), the second switching unit 622 can instead queue the data frames 33 of the second data flow 652 to the same queue at the first data flow 651. This is because the first switching unit 621 had shaped this legacy schema data flow with a TAS, so the second switching unit 622 can be configured to consider the second data flow 652 to now be coming from a TSN compliant entity. In this way, the second switching unit 622 can treat the second data flow 652 as coming from a TSN schema source. The second switching unit 662 can then apply a TAS to shape the second data flow 652 again before transmitting it to the final destination (i.e., the second end node 632 and fourth end node 634).

Many other possible aspects and configurations in addition to that shown in the above figures are contemplated by the present disclosure.

The aspects disclosed herein provide an avionics data network for receiving and delivering a set of data frames. The technical effect is that the above described aspects enable the delivery of a legacy Ethernet schema data frame in a TSN schema network by enabling the delivery of the data frames 33 using the same shaper module 48 for both legacy Ethernet data frames and TSN data frames. In this sense, the data flows from legacy Ethernet devices can achieve the same high QoS and determinism that is achieved by using TSN schema end devices. One advantage that can be realized in the above aspects is that the above described aspects will permit the use of legacy Ethernet equipment to be used along with equipment that supports the newer TSN protocol. Another advantage can include providing a deterministic Ethernet solution to aircraft customers, allowing, enabling, or otherwise accelerating the transition from several older network schemas to a new network schema.

To the extent not already described, the different features and structures of the various aspects can be used in combination with others as desired. That one feature cannot be illustrated in the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

An avionics data network comprising a network switch core configured for a time-sensitive network (TSN) schema; a first set of networking end nodes and a second set of networking end nodes communicatively coupled with the network switch core, the first set of networking end nodes including a first subset of networking end nodes configured for a TSN schema and second subset of networking end nodes configured for a legacy Ethernet schema; wherein the network switch core is configured to: receive, from the first set of networking end nodes, a set of data frames; determine the respective schema of the set of data frames; forward the set of data frames to a predetermined queue on an egress port of the network switch core based on the determined respective schema; and transmit the set of data frames to an end node of the second set of networking end nodes having a corresponding schema; and shape the set of data frames in accordance with the determined respective schema.

The avionics data network of the preceding clause, wherein the network switch core is configured to shape a transmission of the set of data frames using a time aware shaper (TAS) having a predefined cycle time.

The avionics data network of any preceding clause, wherein the network switch core is provided with a schedule for the transmission of the set of data frames determined prior to receiving the set of data frames.

The avionics data network of any preceding clause, wherein in the event the set of data frames is determined to be in accordance with the legacy Ethernet schema, the network switch core is further configured to determine a priority of the set of data frames.

The avionics data network of any preceding clause, wherein when the set of data frames is determined to have a best effort priority, the network switch core is further configured to modify the priority of the set of data frames.

The avionics data network of any preceding clause, wherein the TAS is configured to schedule the transmission of the set of data frames to a networking end node of the second set of networking end nodes to occur within the same cycle in which the set of data frames was transmitted by the networking end node of the first subset of networking end nodes.

The avionics data network of any preceding clause, wherein the network switch core is configured to shape a transmission of the set of data frames using an asynchronous shaper The avionics data network of any preceding clause, wherein the network switch core is configured to shape a transmission of the set of data frames having a legacy Ethernet schema based on unallocated time slot using one of a synchronous and an asynchronous shaper.

The avionics data network of any preceding clause, wherein the network switch core is configured to determine the schema of the set of data frames based on information contained in one of a data frame header and a data frame body.

The avionics data network of any preceding clause, wherein the network switch core is further configured to determine a data transmission bandwidth constraint of the end node.

The avionics data network of any preceding clause, wherein the network switch core is further configured to shape the transmission of the set of data frames to limit a transmission burst of the set of data frames based on a data transmission bandwidth constraint of the destination end node.

The avionics data network of any preceding clause, wherein the network is further configured to determine one or more network switch cores to shape the transmission of the set of data frames.

The avionics data network of any preceding clause, wherein the network switch core is configured to shape the set of data frames for transmission to at least one of meet an effective data rate requirement of at least one networking end node of the first set of networking end nodes and meet a predetermined Quality of Service parameter.

A method of operating a network architecture, comprising receiving, at a set of data ingress ports for a network switch core for a time-sensitive network (TSN) schema, a set of data frames from a first set of networking end nodes having a first subset of networking end nodes compliant with a TSN schema and a second subset of networking end nodes compliant with a legacy Ethernet schema, for transmission to a second set of networking end nodes; determining, with the network switch core, the respective schema of the set of data frames; forwarding the set of data frames to a queue on the network switch core based on the respective schema of the set of data frames; and transmitting, by the network switch core, the set of data frames to an end node of the second set of networking end nodes having a corresponding schema.

The method of any preceding clause, further comprising shaping the set of data frames for a transmission based on the queue using a shaper that is one of a synchronous shaper, an asynchronous shaper, and a priority shaper.

The method of any preceding clause, wherein the shaper is a TAS configured to shape a set of data frames based on a predetermined schedule The method of any preceding clause, further comprising determining, with the network switch core, a data transmission bandwidth constraint of the end node of the second set of networking end nodes.

The method of any preceding clause, further comprising shaping for a transmission to the end node of the second set of networking end nodes to limit a transmission burst of the set of data frames based on the data transmission bandwidth constraint of the end node of the second set of networking end nodes.

The method of any preceding clause, wherein the network switch core is further configured to determine a priority of the set of data frames.

The method of any preceding clause wherein the network switch core is further configured to modify the priority of the set of data frames.

What is claimed is:

1. An avionics data network comprising:
    a controller device;
    a network switch core configured for a time-sensitive network (TSN) schema the network switch core communicatively coupled to the controller device;
        a first set of networking end nodes and a second set of networking end nodes communicatively coupled with the network switch core, the first set of networking end nodes including a first subset of networking end nodes configured for a TSN schema and second subset of networking end nodes configured for a legacy Ethernet schema;
    wherein the network switch core is configured to:
        receive, from the first set of networking end nodes, a set of data frames, wherein the network switch core is provided with a schedule from the controller device for a transmission of the set of data frames from the network switch core to a networking end node of the second set of networking end nodes, the schedule being determined prior to receiving the set of data frames by the network switch core;
        determine the respective schema of the set of data frames;
        queue the set of data frames in a respective egress queue on an egress port of the network switch core based on the determined respective schema to isolate data frames having the TSN schema from of data frames having the legacy Ethernet schema;
determine a data transmission bandwidth constraint of the networking end node of the second set of networking end nodes;
shape a transmission of the set of data frames, using a traffic shaper, based on the data transmission bandwidth constraint, wherein the set of data frames are scheduled for transmission to the networking end node of the second set of networking end nodes within a cycle time of the traffic shaper in which the set of data frames was transmitted by the first subset of the networking end nodes; and
transmit the set of data frames to an end node of the second set of networking end nodes having a corresponding schema based on the schedule;
wherein in the event the set of data frames is determined to be in accordance with the legacy Ethernet schema, the network switch core is further configured to determine a priority of the set of data frames; and
wherein in the event the set of data frames is determined to have a best effort priority, the network switch core is further configured to modify the priority of the set of data frames in order to meet a quality requirement for the avionics data network.

2. The avionics data network of claim 1, wherein the traffic shaper is a time aware shaper (TAS) having a predefined cycle time.

3. The avionics data network of claim 2, wherein the TAS is configured to schedule the transmission of the set of data frames to the networking end node of the second set of networking end nodes to occur within the same cycle in which the set of data frames was transmitted by a networking end node of the first subset of networking end nodes.

4. The avionics data network of claim 1, wherein the traffic shaper is an asynchronous shaper.

5. The avionics data network of claim 1, wherein the network switch core is configured to shape a transmission of the set of data frames having a legacy Ethernet schema based on unallocated time slot using the traffic shaper, wherein the traffic shaper is one of a synchronous and an asynchronous shaper.

6. The avionics data network of claim 1, wherein the network switch core is configured to determine the schema of the set of data frames based on information contained in one of a data frame header and a data frame body.

7. The avionics data network of claim 2, wherein the network switch core is configured to shape the set of data frames for transmission to at least one of meet an effective data rate requirement of at least one networking end node of the first set of networking end nodes and meet a predetermined Quality of Service parameter.

8. A method of operating an avionics data network, comprising:

receiving, at a set of data ingress ports for a network switch core configured for a time-sensitive network (TSN) schema,
a set of data frames from a first set of networking end nodes having a first subset of networking end nodes compliant with a TSN schema and a second subset of networking end nodes compliant with a legacy Ethernet schema, for transmission to a second set of networking end nodes, wherein the network switch core is provided with a schedule from a controller device communicatively coupled to the network switch core, for the transmission of the set of data frames, the schedule being determined prior to receiving the set of data frames;
determining, with the network switch core, the respective schema of the set of data frames;
queueing the set of data frames in a respective egress queue on an egress port of the network switch core based on the determined respective schema to isolate data frames having the TSN schema from of data frames having the legacy Ethernet schema;
determining a data transmission bandwidth constraint of a networking end node of the second set of networking end nodes;
shaping a transmission of the set of data frames, using a traffic shaper, based on the data transmission bandwidth constraint, wherein the set of data frames are scheduled for transmission to the networking end node of the second set of networking end nodes within a cycle time of the traffic shaper in which the set of data frames was transmitted by the first subset of the networking end nodes;
forwarding the set of data frames to a queue on the network switch core based on the respective schema of the set of data frames; and
transmitting, by the network switch core, the set of data frames to an end node of the second set of networking end nodes having a corresponding schema based on the schedule;
wherein in the event the set of data frames is determined to be in accordance with the legacy Ethernet schema, determining a priority of the set of data frames; and
in the event the set of data frames is determined to have a best effort priority, modifying the priority of the set of data frames in order to meet a quality requirement for the avionics data network.

9. The method of claim 8, wherein the traffic shaper is one of a synchronous shaper, an asynchronous shaper, and a priority shaper.

10. The method of claim 9, wherein the traffic shaper is a TAS configured to shape a set of data frames based on the schedule.

* * * * *